United States Patent
Salajegheh et al.

(10) Patent No.: US 10,536,867 B2
(45) Date of Patent: Jan. 14, 2020

(54) ON-DEVICE BEHAVIORAL ANALYSIS TO DETECT MALFUNCTION DUE TO RF INTERFERENCE

(71) Applicant: QUALCOMM Incorporated, San Diego, CA (US)

(72) Inventors: Mastooreh Salajegheh, San Jose, CA (US); Govindarajan Krishnamurthi, Palo Alto, CA (US); Rajarshi Gupta, Sunnyvale, CA (US); Mihai Christodorescu, San Jose, CA (US); Vinay Sridhara, Santa Clara, CA (US); Patrick Hughes, Dana Point, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 14/620,341

(22) Filed: Feb. 12, 2015

(65) Prior Publication Data
US 2016/0242050 A1    Aug. 18, 2016

(51) Int. Cl.
*H04W 24/08* (2009.01)
*H04W 4/029* (2018.01)
(Continued)

(52) U.S. Cl.
CPC ............ *H04W 24/08* (2013.01); *G01S 7/023* (2013.01); *G06F 1/1626* (2013.01);
(Continued)

(58) Field of Classification Search
CPC ..... H04W 24/08; H04W 4/02; H04W 64/003; H04W 24/02; H04W 16/18; H04W 28/06;
(Continued)

(56) References Cited

U.S. PATENT DOCUMENTS 7,068,998 B2    6/2006  Zavidniak et al.
7,667,575 B2    2/2010  Husak et al.
(Continued)

FOREIGN PATENT DOCUMENTS

CN    103987048 A    8/2014

OTHER PUBLICATIONS

International Search Report and Written Opinion—PCT/US2016/013168 ISA/EPO—dated Apr. 19, 2016.

*Primary Examiner* — Fred A Casca
(74) *Attorney, Agent, or Firm* — The Marbury Law Group/Qualcomm

(57) ABSTRACT

Systems, methods, and devices of the various aspects enable detecting a malfunction caused by radio frequency (RF) interference. A computing device processor may identify a location of the computing device based on a plurality of real-time data inputs received by the computing device. The processor may characterize an RF environment of the computing device based on the identified location and the plurality of real-time data inputs. The processor may determine at least one RF emissions threshold based on the characterization of the RF environment. The processor may compare the characterization of the RF environment to the at least one RF emissions threshold, and may perform an action in response to determining that the characterization of the RF environment exceeds the at least one RF emissions threshold.

28 Claims, 8 Drawing Sheets

(51) Int. Cl.

| | |
|---|---|
| *H04W 16/28* | (2009.01) |
| *H04B 7/0417* | (2017.01) |
| *H04W 16/18* | (2009.01) |
| *H04W 16/22* | (2009.01) |
| *H04B 7/0452* | (2017.01) |
| *H04B 7/06* | (2006.01) |
| *H04B 15/00* | (2006.01) |
| *H04B 17/345* | (2015.01) |
| *H04B 17/27* | (2015.01) |
| *H04B 17/391* | (2015.01) |
| *H04B 17/17* | (2015.01) |
| *G06F 1/3215* | (2019.01) |
| *G06F 1/16* | (2006.01) |
| *H04W 72/08* | (2009.01) |
| *H04W 52/24* | (2009.01) |
| *H04W 64/00* | (2009.01) |
| *H04B 7/0413* | (2017.01) |
| *G01S 7/02* | (2006.01) |

(52) U.S. Cl.
CPC .......... *G06F 1/1656* (2013.01); *G06F 1/1684* (2013.01); *G06F 1/1694* (2013.01); *G06F 1/3215* (2013.01); *H04B 7/0417* (2013.01); *H04B 7/0421* (2013.01); *H04B 7/0452* (2013.01); *H04B 7/061* (2013.01); *H04B 7/0608* (2013.01); *H04B 7/0626* (2013.01); *H04B 15/00* (2013.01); *H04B 17/17* (2015.01); *H04B 17/27* (2015.01); *H04B 17/345* (2015.01); *H04B 17/3911* (2015.01); *H04W 4/029* (2018.02); *H04W 16/18* (2013.01); *H04W 16/22* (2013.01); *H04W 16/28* (2013.01); *H04W 52/245* (2013.01); *H04W 64/003* (2013.01); *H04W 72/082* (2013.01); *H04B 7/0413* (2013.01); *H04W 52/243* (2013.01)

(58) Field of Classification Search
CPC ..... H04W 48/16; H04W 84/12; H04W 8/005; H04W 16/24; H04W 16/26; H04W 36/22; H04W 52/24; H04W 52/243; H04W 28/0236; H04W 72/082; H04W 40/16; H04W 52/245; H04B 15/00; H04B 17/27; H04B 17/318; H04B 7/0617; G01S 7/023; G01S 19/21; G01S 19/22; G01S 5/0215

USPC ........... 455/423, 63.1, 67.13, 404.2; 370/328

See application file for complete search history.

(56) References Cited

U.S. PATENT DOCUMENTS

| | | | |
|---|---|---|---|
| 8,370,931 | B1 | 2/2013 | Chien et al. |
| 8,472,968 | B1* | 6/2013 | Kim ...................... H04W 24/02 455/456.1 |
| 2005/0064870 | A1* | 3/2005 | Gabara ................. H04W 64/00 455/438 |
| 2006/0183426 | A1 | 8/2006 | Graves et al. |
| 2007/0105501 | A1* | 5/2007 | Shen ................... H04W 52/243 455/63.1 |
| 2009/0021343 | A1 | 1/2009 | Sinha |
| 2010/0177710 | A1* | 7/2010 | Gutkin ............... H04W 72/082 370/329 |
| 2010/0298005 | A1* | 11/2010 | Yavuz .................... H04W 36/20 455/452.2 |
| 2011/0300805 | A1* | 12/2011 | Gaikwad ............. H04W 52/243 455/63.1 |
| 2011/0312282 | A1* | 12/2011 | Prather .................. H04B 17/23 455/67.13 |
| 2012/0134280 | A1* | 5/2012 | Rotvold ............... H04B 17/345 370/252 |
| 2012/0250521 | A1* | 10/2012 | Marinier ............. H04W 72/082 370/241 |
| 2013/0150106 | A1* | 6/2013 | Bucknell ............... H04W 16/14 455/501 |
| 2013/0310068 | A1 | 11/2013 | Fischer et al. |
| 2014/0004865 | A1* | 1/2014 | Bhargava .......... H04W 74/0816 455/445 |
| 2014/0171114 | A1* | 6/2014 | Marti .................... H04W 64/00 455/456.1 |
| 2014/0302796 | A1* | 10/2014 | Gormley ............... H04W 24/08 455/67.13 |
| 2014/0347978 | A1 | 11/2014 | Kim et al. |

* cited by examiner

US 10,536,867 B2

ON-DEVICE BEHAVIORAL ANALYSIS TO DETECT MALFUNCTION DUE TO RF INTERFERENCE

BACKGROUND

The proliferation of portable electronics, computing devices, and communication devices has radically altered the environment in which people live, work, and play. Electronic devices are relied on to perform important tasks, such as monitoring the physical security of locations, the condition of patients, the safety of children, and the physical condition of machinery, to name but a few examples. The electronic environment has become vastly more complex, as has the potential for electronic devices to interfere with one another. For example, the radio frequency (RF) emissions of one device may interfere with the function of another device. Particularly where electronic devices are used in health and safety applications, anticipating potential RF interference that may cause a device malfunction can be of great importance.

SUMMARY

Systems, methods, and devices of various aspects enable a processor of a computing device to detect a malfunction caused by radio frequency (RF) interference by identifying a location of a computing device based on a plurality of real-time data inputs received by the computing device, characterizing an RF environment of the computing device based on the identified location and the plurality of real-time data inputs, determining at least one RF emissions threshold based on the characterization of the RF environment, comparing the characterization of the RF environment to the at least one RF emissions threshold, and performing an action in response to determining that the characterization of the RF environment exceeds the at least one RF emissions threshold.

In an aspect, identifying a location of a computing device based on a plurality of real-time data inputs received by the computing device may include computing a plurality of RF behavior vectors based on the plurality of real-time data inputs, and identifying the location of the computing device using the plurality of RF behavior vectors. In an aspect, identifying the location of the computing device using the plurality of RF behavior vectors may include applying the plurality of RF behavior vectors to a plurality of RF classifier models to generate analysis results, and identifying the location of the computing device based on the analysis results. In an aspect, characterizing an RF environment of the computing device based on the identified location and the plurality of real-time data inputs may include computing a plurality of RF behavior vectors based on the plurality of real-time data inputs, and characterizing the RF environment of the computing device using the plurality of RF behavior vectors.

In an aspect, characterizing the RF environment of the computing device using the plurality of RF behavior vectors may include applying plurality of RF behavior vectors to a plurality of RF classifier models to generate analysis results, and characterizing the RF environment of the computing device based on the analysis results. In an aspect, determining at least one RF emissions threshold based on the RF characterization of the environment may include determining at least one RF emissions threshold based on the analysis results. In an aspect, the at least one RF emissions threshold may include one or more of an RF emissions threshold of RF emissions by the computing device, and an RF emissions threshold of RF emissions of another device in the location.

In an aspect, comparing the characterization of the RF environment to the at least one RF emissions threshold may include comparing the characterization of the RF environment to at least one of the RF emissions threshold of RF emissions by the computing device and the RF emissions threshold of RF emissions of another device in the location. In an aspect, performing an action in response to determining that the characterization of the RF environment exceeds the at least one RF emissions threshold comprises performing an action to protect the another device in response to determining that the characterization of the RF environment exceeds the RF emissions threshold of RF emissions by the computing device.

In an aspect, performing an action in response to determining that the characterization of the RF environment exceeds the at least one RF emissions threshold may include performing an action to protect the computing device in response to determining that the characterization of the RF environment exceeds the RF emissions threshold of RF emissions by the computing device. In an aspect, the plurality of real-time data inputs may include at least one of a video input, an audio input, an ambient light level, a vibration, an acceleration, compass information, global positioning information, RFID tag information, a radio access technology signal level, an ambient FM signal level, and an ambient AM signal level.

Further aspects include a computing device including a processor configured with processor-executable instructions to perform operations of the aspect methods described above. Further aspects include a non-transitory processor-readable storage medium having stored thereon processor-executable software instructions configured to cause a processor to perform operations of the aspect methods described above. Further aspects include a computing device that includes means for performing functions of the operations of the aspect methods described above.

BRIEF DESCRIPTION OF THE DRAWINGS

The accompanying drawings, which are incorporated herein and constitute part of this specification, illustrate exemplary aspects, and together with the general description given above and the detailed description given below, serve to explain the features of the various aspects.

DETAILED DESCRIPTION

Figure 1A:
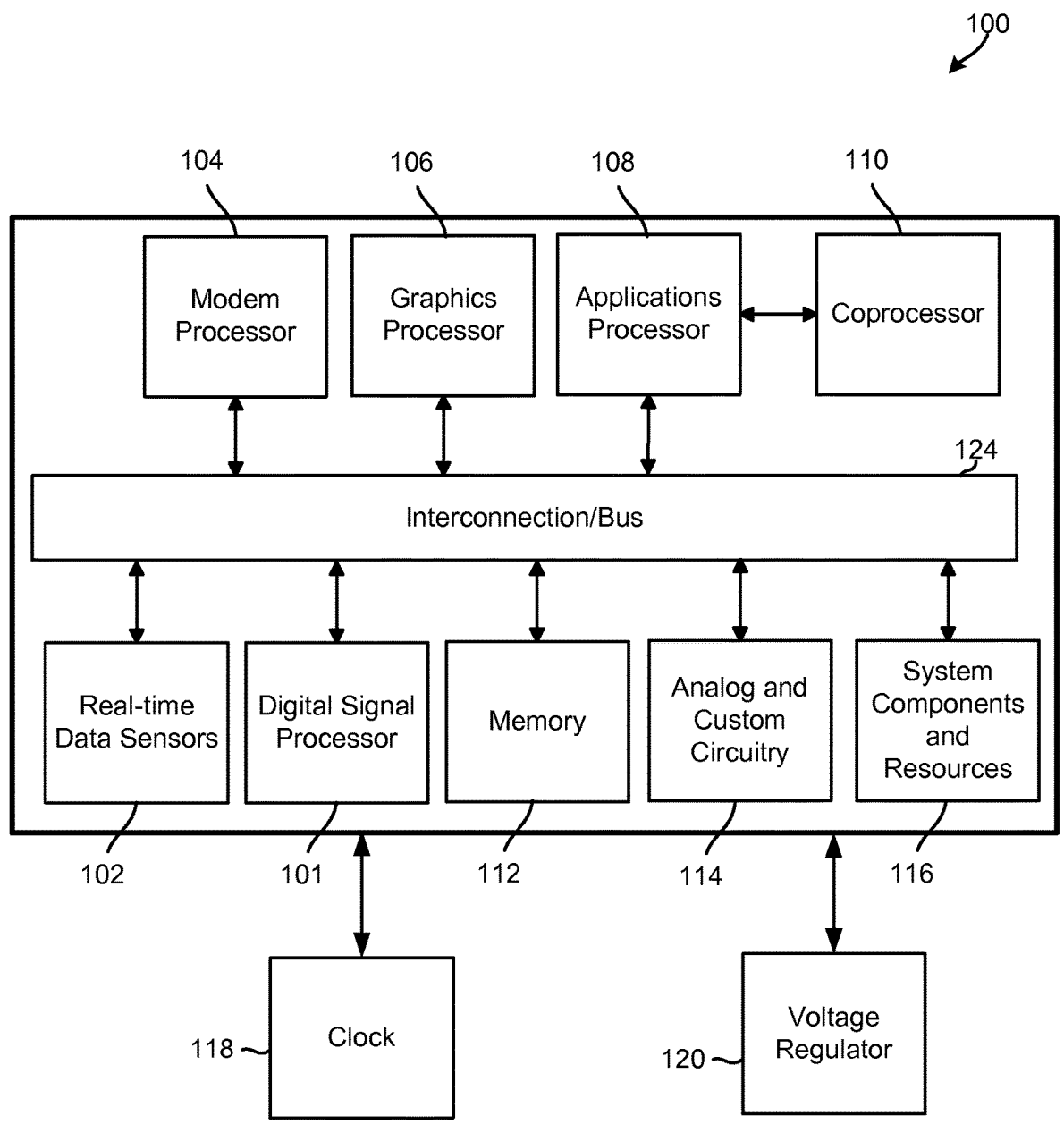
FIG. 1A is an architectural diagram of an example system-on-chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the various aspects or the claims.

The various aspects include methods, and computing devices configured to implement the methods, of using a behavioral analysis system to evaluate an RF environment, to determine whether RF interference may cause a malfunction in an electronic device in the environment, and to initiate or perform an action to protect the computing device and/or another device in the environment. A computing device, such as a mobile communication device, may receive data inputs from various device sensors providing real-time information about the environment around the computing device such as audio, video, ambient light, vibration, acceleration, global positioning information (e.g., GPS), RFID signals (e.g., from an interrogated RFID tag or an active RFID tag), radio signal level (e.g., cellular, Wi-Fi, AM, FM, etc.), etc. The computing device may use the real-time data inputs as context clues to identify the location of the computing device. In some aspects, identifying the location may include identifying at least one other electronic device in the environment using the real-time data. The computing device may use the identified location and the real-time data inputs to characterize an RF environment, which may include characterizing including the criticality of RF interference in the environment. For example, a hospital may include many electronic devices that are sensitive to RF interference, and so when the computing device determines that it is located within a hospital the computing device may determine that it is located in an RF-sensitive environment.

The computing device may identify one or more electronic devices that are in the environment, and may characterize their actual and/or potential RF emissions. For example, the computing device may identify a wireless baby monitor in the environment, and may characterize the environment as sensitive to RF interference in response to identifying the wireless baby monitor. As another example, the computing device may identify another device that is a source of RF emissions that may interfere with the computing device, such as a magnetic resonance imaging (MRI) device, and may characterize the environment as posing a potential RF risk to the computing device in response to identifying the MRI device. The computing device may also characterize its own actual and/or potential RF emissions by performing a self-analysis to ensure that current radiation emissions are within limits of other devices in the environment.

The computing device may include a behavioral analysis system that may generate one or more RF behavior vectors using the sensed real-time data. The computing device may compare the RF behavior vectors to one or more RF classifier models to determine whether another device in the environment may cause RF interference with the computing device and/or whether the computing device's own RF emissions may interfere with the another device in the environment. The computing device may also determine a severity level of actual or potential RF emissions or interference. The computing device may initiate or recommend an action based the determination, such as protecting the computing device from the environment (e.g., by securing its memory), or displaying an alert recommending that the device be removed from the environment. The action may also protect the environment from the device, such as by shutting down a radio and antenna that is radiating RF emissions, putting the device into a sleep mode, or shutting the device down.

The terms "computing device" and "mobile device" are used interchangeably herein to refer to any one or all of cellular telephones, smartphones, personal or mobile multimedia players, personal data assistants (PDAs), laptop computers, tablet computers, smartbooks, ultrabooks, palmtop computers, wireless electronic mail receivers, multimedia Internet enabled cellular telephones, wireless gaming controllers, and similar personal electronic devices which include a memory, a programmable processor, and RF sensors.

The terms "component," "module," "system," and the like are used herein to refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A behavioral analysis system may include a behavior observer module and a behavior analyzer module. The behavior observer module may be configured to implement application programming interfaces (APIs) at various hardware and software of a device in order to monitor the behavior (e.g., activities, conditions, operations, and events) of the device (e.g., system events, state changes, etc.). The monitoring of executing APIs may be used to detect real-time sensor data. Examples of observed behaviors may include data received through a hardware device, software activity, and communication and/or instructions sent between hardware devices and/or software devices. The behavior observer module may collect behavior information pertaining to the observed real-time data and may store the collected information in a memory (e.g., in a log file, etc.) in the form of behavior vectors. In the various aspects, the analyzer module may compare the generated behavior vectors to one or more classifier models to determine a location of the computing device, to characterize the RF environment, and to determine whether there is a risk that RF emission interference for the computing device and/or for another electronic device in the environment.

In various aspects, the behavioral analysis system may generate one or more RF behavior vectors using the sensed real-time data. In some aspects, the behavioral analysis system may compare the generated RF behavior vectors to a plurality of RF classifier models to determine whether a device in the environment could cause RF interference with the mobile device, and/or whether the mobile device's emissions could cause RF interference with another device in the environment. The behavioral analysis system may also determine a severity level of actual or potential RF interference. Based on the comparison of the generated RF behavior vectors to the one or more RF classifier models, the behavioral analysis system may initiate or recommend an action. In some aspects, the action may protect the device from the environment, such as by securing its memory, or displaying an alert recommending that the device be removed from the environment. In some aspects, the action may also protect the environment from the device, such as by shutting down an antenna that is radiating RF emissions, or putting the device into a sleep mode or shutting the device down. The action may include other examples, as well as combinations of the foregoing.

By using machine learning and/or behavioral analysis techniques, the computing device may continuously (or near continuously) monitor the hardware and/or software systems of the device and characterize the RF environment of the computing device without consuming an excessive amount of the device's processing or power resources under the circumstances. For all the above-mentioned reasons, the various aspects are well-suited for inclusion and use in resource-constrained computing devices, such as mobile devices, which have limited processing and battery resources and for which determining an RF environment of the computing device and protecting both the computing device and other electronic devices in the environment is important.

The behavior analysis system may include processes, daemons, modules, or sub-systems (herein collectively referred to as a "module") to observe real-time sensor data of the computing device, extract one or more features of the real-time sensor data, and to analyze the extracted one or more features. An observer module may be configured to instrument or coordinate various APIs, registers, counters, or other device components (herein collectively "instrumented components") at various levels of the computing device system, collect real-time sensor data from the instrumented components, and communicate (e.g., via a memory write operation, function call, etc.) the collected real-time data to the feature extractor module.

The feature extractor module may use the collected real-time data to generate behavior vectors that each represent or characterize many or all of the observed real-time data. The feature extractor module may communicate (e.g., via a memory write operation, function call, etc.) the generated behavior vectors to an analyzer module.

The analyzer module may apply the behavior vectors to classifier models to generate analysis results, and use the analysis results to identify a location of the computing device, to characterize the RF environment of the computing device, and to determine whether RF interference may adversely affect the computing device and/or the environment (e.g., another electronic device in the environment). The device processor may perform various operations to protect the computing device and/or another electronic device in the environment.

Each behavior vector may be a data structure or an information structure that includes or encapsulates one or more features. A behavior vector may include an abstract number or symbol that represents all or a portion of real-time data observed by a sensor of the computing device (i.e., a feature). Each feature may be associated with a data type that identifies a range of possible values, operations that may be performed on those values, the meanings of the values, and other similar information. The data type may be used by the computing device to determine how the corresponding feature (or feature value) should be measured, analyzed, weighted, or used.

In an aspect, the computing device may be configured to generate a behavior vector of size "n" that maps the observer real-time data into an n-dimensional space. Each number or symbol in the behavior vector (i.e., each of the "n" values stored by the vector) may represent the value of a feature. The computing device may analyze the behavior vector (e.g., by applying the behavior vector to a model of various environments corresponding with various real-time data.) to determine the location of the computing device, and to characterize the RF environment of the computing device. In some aspects, the computing device may also aggregate the behavior scores of all observed real-time data, for example, into an average behavior score, a weighted average behavior score, or another aggregation. In some aspects, one or more weights may be selected based on the feature of the real-time data.

In an aspect, the computing device may be configured to store models of RF-sensitive environments and non-RF-sensitive environments. A model of an RF-sensitive environment may identify one or more features of observable real-time data that may be associated with an RF-sensitive environment. In some aspects, models of RF environments may be stored in a cloud server or network, shared across a large number of devices, sent to the computing device periodically or on demand, and customized in the device based on the available sensors of the computing device. One or more models of RF-sensitive environments and/or non-RF-sensitive may be, or may be included, in a classifier model. In some aspects, the behavioral analysis system may adjust the size of a behavior vector to change the granularity of features extracted from the real-time data.

A classifier model may be a behavior model that includes data, entries, decision nodes, decision criteria, and/or information structures that may be used by a device processor to quickly and efficiently test or evaluate features (E.g., specific factors, data points, entries, APIs, states, conditions, behaviors, software applications, processes, operations, and/or components, etc.) of the observed real-time data. A classifier model may include a larger or smaller data set, the size of which may affect an amount of processing required to apply a behavior vector to the classifier model. For example, a "full" classifier model may be a large and robust data model that may be generated as a function of a large training dataset, and which may include, for example, thousands of features and billions of entries. As another example, a "lean" classifier model may be a more focused data model that is generated from a reduced dataset that includes or prioritizes tests on the features/entries that are most relevant for determining and characterizing a particular computing device's RF environment using the sensors and software available on that particular computing device. In some aspects, the behavioral analysis system may change the robustness and/or size of a classifier model used to analyze a behavior vector.

A local classifier model may be a lean classifier model that is generated in the mobile computing device. By generating classifier models in the computing device in which the models are used, the various aspects allow the computing device to accurately identify the specific features that are most important in determining and characterizing a particular computing device's RF environment using the sensors and software available on that particular computing device.

These aspects also allow the computing device to accurately prioritize the features in the classifier models in accordance with their relative importance to classifying behaviors in that specific device.

The various aspects may be implemented in a number of different computing devices, including single processor and multiprocessor systems, and a system-on-chip (SOC). FIG. 1A is an architectural diagram illustrating an example SOC 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may include one or more real-time data sensors 102 that may observe real-time data, including audio, video, ambient light, vibration, acceleration, global positioning information (e.g., GPS), RFID information (e.g., from an interrogated RFID tag or an active RFID tag), cellular signal level, and other data that may by sensed by one or more device sensors. The real-time data sensors may include hardware and software to receive real-time data from one or more of a camera, a microphone, a gyroscope, an accelerometer, a pressure sensor, a magnetic field sensor, a thermal sensor (for internal and/or external temperature), an electronic display, a data controller, a memory controller, a system controller, access ports, timers, peripheral devices, wireless communication components (e.g., cellular, Wi-Fi, Bluetooth, etc.), near-field communication (NFC) signaling components, a bar code scanner or tag reader (e.g., an RFID tag reader), an external sensor plugged into a device peripheral port or connector (e.g., USB, audio jack, etc.), external memory chips, voltage regulators, oscillators, phase-locked loops, peripheral bridges, and other similar components used to support the processors and software that may run on the computing device 102. The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, and 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth, WLAN, Wi-Fi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 1B:
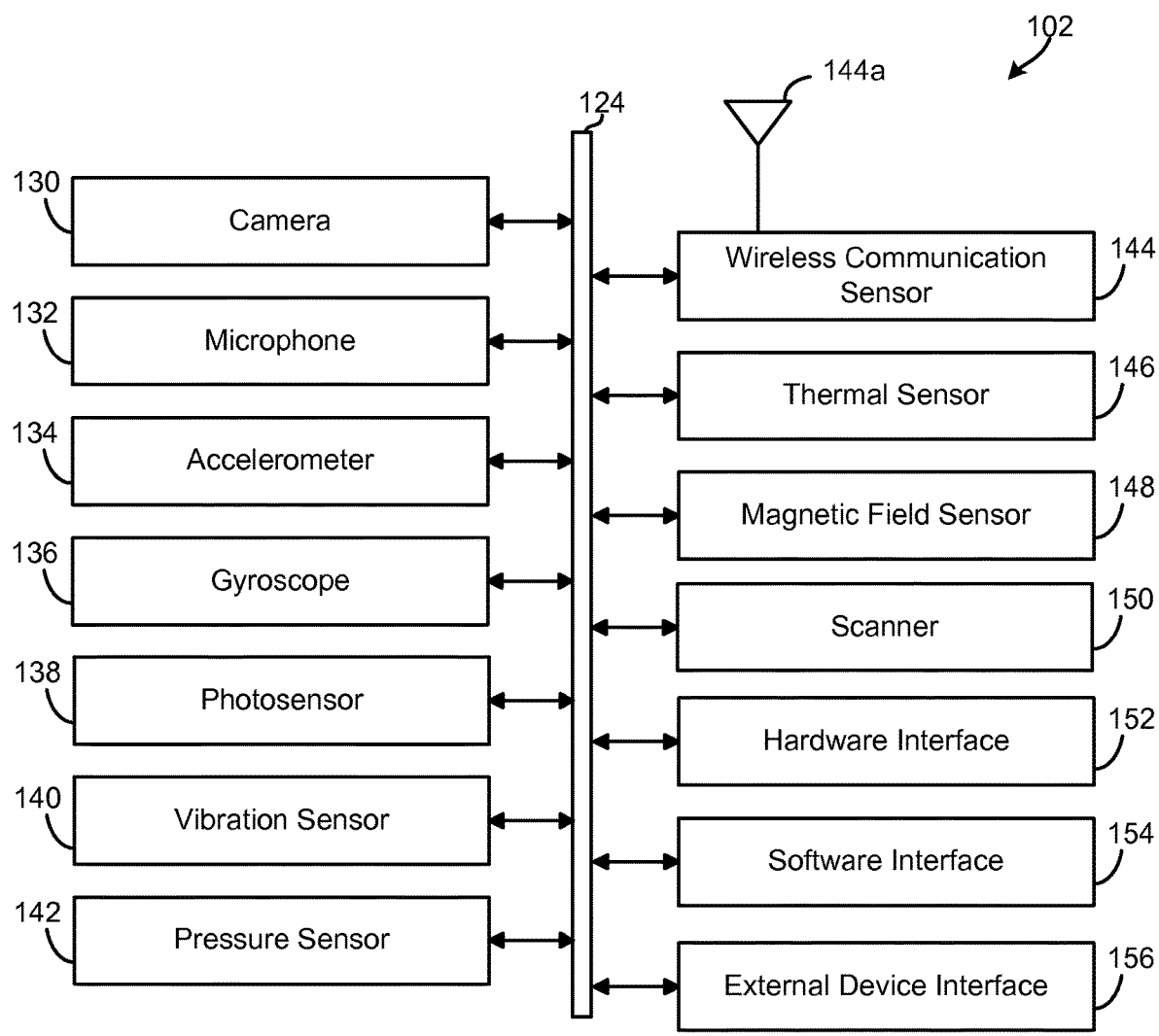
FIG. 1B is an architectural diagram of example sensors suitable for implementing the various aspects.

FIG. 1B is an architectural diagram illustrating example real-time data sensors 102 that may be used in computing devices implementing the various aspects. The real-time data sensors 102 may include a camera 130, a microphone 132, an accelerometer 134, a gyroscope 136, a photosensor 138, a vibration sensor 140, and a pressure sensor 142, each of which may communicate with other components of the SOC 100 (e.g., one of the processors 101, 104, 106, and/or 108) over the interconnection/bus module 124. The real-time data sensors may also include a wireless communication sensor 144, which may communicate with one or more antennas 144a, to detect wireless communication signals, RF signals, NFC signals, GPS signals, and other similar wireless communication signals. The antennas 144a may include signal reception circuitry, a modem, and other hardware and/or software (not illustrated) to receive signals.

The real-time data sensors may also include one or more thermal sensors 146, which may detect an internal temperature of the mobile device and/or an ambient temperature outside of the mobile device. The real-time data sensors may also include a magnetic field sensor 148, which may detect the terrestrial magnetic field as well as magnetic emanations from one or more electronic devices. A scanner 150 may also be included in the real-time data sensors, such as a bar code scanner or tag reader (e.g., an RFID tag reader), which may be configured to emit one or more interrogation signals or scanning signals and to receive a response from, e.g., a bar code or signal-interrogatable tag. The real-time data sensors may also include a hardware interface 152 configured to enable reception of data from an electronic display, a data controller, a memory controller, a system controller, access ports, timers, and other similar hardware of the mobile device. A software interface 154 may also be included in the real-time data sensors, to enable reception of data from one or more software applications, drivers, APIs, operating system, or other software of the mobile device. The real time data sensors may also include an external device interface 156 configured to enable reception of data from an external sensor or a peripheral device plugged into a device peripheral port or connector (e.g., USB, audio jack, etc.).

Figure 2:
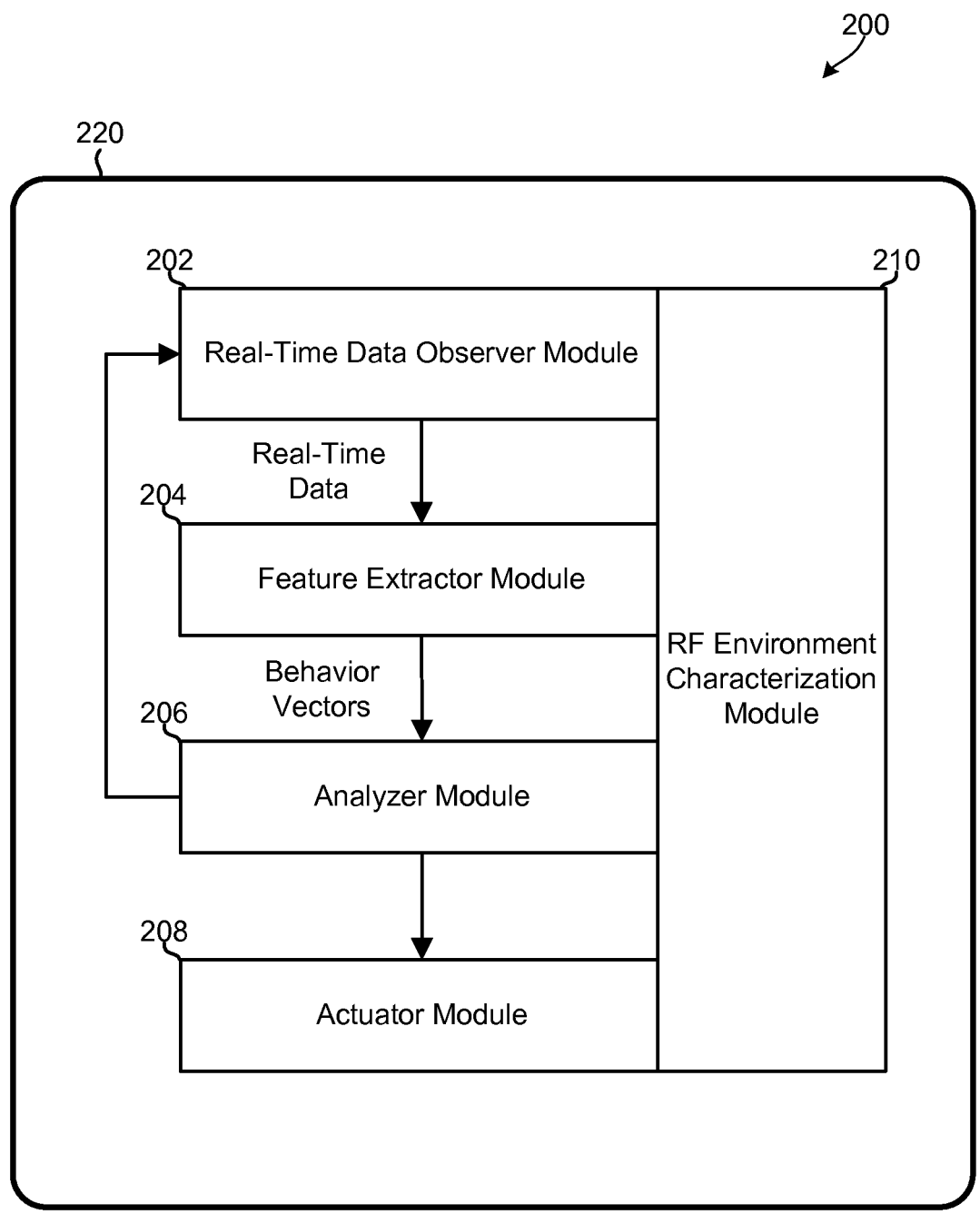
FIG. 2 is a block diagram illustrating example logical components and information flows in an RF environment characterization system suitable for use with the various aspects.

FIG. 2 illustrates example logical components and information flows in an aspect computing device that includes an RF environment characterization system 200 configured to use behavioral analysis techniques to characterize an RF environment in accordance with the various aspects. In the example illustrated in FIG. 2, the computing device is a mobile device 220 that includes a device processor (e.g., a mobile device processor) configured with executable instruction modules that include a real-time data observer module 202, a real-time data extractor module 204, an analyzer module 206, an actuator module 208, and an RF environment characterization module 210.

In various aspects, all or portions of the RF environment characterization module 210 may be implemented as part of the real-time data observer module 202, the real-time data extractor module 204, the analyzer module 206, or the actuator module 208. Each of the modules 202-210 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 220.

The RF environment characterization module 210 may be configured to characterize the RF environment of the computing device, determine at least one RF threshold based on the RF characterization of the environment, and to initiate or perform an action to protect the computing device and/or another device in the environment from RF interference based on any or all of the information collected, generated, or analyzed by the other modules 202-208. The RF environment characterization module 210 may use the information collected by the real-time data observer module 202 to determine conditions in the local environment of the computing device and use any or all such information to identify the present location of the computing device. The RF environment characterization module 210 may use the conditions in the local environment of the computing device and/or the identified location of the computing device to characterize the RF environment in which the computing device is located.

The real-time data observer module 202 may be configured to instrument application programming interfaces (APIs), counters, hardware monitors, etc. at various levels/modules of the device, and monitor the activities, conditions, operations, and events (e.g., system events, state changes, etc.) at various real-time data sensors (e.g., the real-time data sensors 102 in FIGS. 1A, 1B and 2). The real-time data observer module 202 may be configured to monitor the real-time data received by a computing device (e.g., a computing device including the SOC 100 illustrated in FIG. 1A) by collecting information pertaining to library API calls in an application framework or run-time libraries, system call APIs, file-system and networking sub-system operations, device (including sensor devices) state changes, and other similar events.

Real-time data that may be observed by the real-time data observer module include audio, video, ambient light, vibration, acceleration, global positioning information (e.g., GPS), RFID information (e.g., from an interrogated RFID tag or an active RFID tag), cellular signal level, and other data that may by sensed by one or more device sensors. The real-time data observer module 202 may also monitor driver statistics and/or the status of one or more hardware components, which may include cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the computing device 220. The real-time data observer module 202 may also monitor data sensed by, and updates to, compass information, computing device settings, battery life, gyroscope information, pressure sensors, magnet sensors, screen activity, etc. Other examples of real-time sensor observations may include detecting near-field communication (NFC) signaling, collecting information from a barcode scanner or a tag reader (e.g., RFID tag information), and detecting that the mobile computing device 220 has been coupled to another computing device (e.g., via Bluetooth or Wi-Fi), collecting information from an external sensor plugged into a device peripheral port or connector (e.g., USB, audio jack, etc.), collecting information from a tactile or haptic sensor (e.g., via a vibration sensor, an accelerometer, etc.), and collecting information pertaining to the thermal state of the computing device 220.

To reduce the number of factors monitored to a manageable level, in an aspect, the real-time data observer module 202 may be configured to perform coarse observations by monitoring/observing an initial set of behaviors or factors that are a small subset of all factors that could contribute to the computing device's vulnerability or degradation. In some aspects, the real-time data observer module 202 may receive the initial set of behaviors and/or factors from a server and/or a component in a cloud service or network. In some aspects, the initial set of behaviors/factors may be specified in machine learning classifier models.

The real-time data observer module 202 may communicate (e.g., via a memory write operation, function call, etc.) the collected real-time data to the feature extractor module 204. The feature extractor module 204 may be configured to receive or retrieve the collected real-time data and use this information to generate one or more behavior vectors. Each behavior vector may succinctly describe the observed real-time data in a value or vector data-structure. In some aspects, the vector data-structure may include a series of numbers, each of which signifies a partial or complete representation of the real-time data collected by the behavior observer module 202.

In some aspects, the feature extractor module 204 may be configured to generate the behavior vectors so that they function as an identifier that enables the behavioral analysis system (e.g., the analyzer module 206) to quickly recognize, identify, or analyze real-time sensor data of the device. In an aspect, the feature extractor module 204 may be configured to generate behavior vectors of size "n," each of which maps the real-time data of a sensor or hardware or software behavior into an n-dimensional space. In an aspect, the feature extractor module 204 may be configured to generate the behavior vectors to include information that may be input to a feature/decision node in the RF environment characterization module to generate an answer to a query regarding one or more features of the real-time data to characterize the RF environment of the computing device.

The feature extractor module 204 may communicate (e.g., via a memory write operation, function call, etc.) the generated behavior vectors to the analyzer module 206. The analyzer module 206 may be configured to apply the behavior vectors to classifier modules to determine a location of the computing device. In addition, the behavior analyzer module 206 may be configured to apply the behavior vectors to classifier modules to characterize the RF environment of the computing device.

Each classifier model may be a behavior model that includes data and/or information structures (e.g., feature vectors, behavior vectors, component lists, etc.) that may be used by a computing device processor to evaluate a specific feature or aspect of the sensed real-time data. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, or other methods of generating classifier models.

Each classifier model may be a full classifier model or a lean classifier model. A full classifier model may be a robust data model that is generated as a function of a large training dataset, which may include thousands of features and billions of entries. A lean classifier model may be a more focused data model that is generated from a reduced dataset that analyzes or tests only the features/entries that are most relevant for evaluating real-time data. A lean classifier model may be used to analyze a behavior vector that includes a subset of the total number of features and behaviors that could be observed in a computing device. As an example, a device processor may be may be configured to receive a full classifier model from a network server, generate a lean classifier model in the mobile device based on the full classifier, and use the locally generated lean classifier model to evaluate real-time data collected in a behavior vector.

A locally generated lean classifier model is a lean classifier model that is generated in the computing device. That is, since mobile computing devices are highly configurable and complex systems, the features that may be extracted from real-time data may be different in each device. Further, a different combination of features may be monitored and/or analyzed in each device in order for that device to quickly and efficiently determine whether the location of the computing device and to characterize the RF environment. The precise combination of features that require monitoring and analysis, and the relative priority or importance of each feature or feature combination, may often only be determined using information obtained from the specific device for which the location is to be determined and the characterized RF environment. For these and other reasons, various aspects may generate classifier models in the mobile device in which the models are used.

Local classifier models may enable the device processor to accurately identify those specific features that are most important for determining the location of the computing device and characterizing the RF environment for that computing device. The local classifier models may also allow the device processor to prioritize the features that are tested or evaluated in accordance with their relative importance to determining the location of the computing device and characterizing the RF environment.

In some aspects, a device-specific classifier model may be used, which is a classifier model that includes a focused data model that includes/tests only computing device-specific features/entries that are determined to be most relevant to determining the location of the computing device and characterizing the RF environment. By dynamically generating device-specific classifier models locally in the mobile device, the various aspects allow the device processor to focus monitoring and analysis operations on a small number of features that are most important, applicable, and/or relevant for determining the location of the computing device and characterizing the RF environment for that specific computing device.

In an aspect, the analyzer module 206 may be configured to adjust the granularity or level of detail of the features of the real-time data that the analyzer module evaluates, in particular when an analysis features of real-time data is inconclusive. For example, the analyzer module 206 may be configured to notify the real-time data observer module 202 in response to determining that it cannot identify a location and/or characterize the RF environment based on a current set of features of real-time data provided to the analyzer module (i.e., cannot determine a location and/or characterize the RF environment to a threshold level of certainty). In response, the real-time data observer module 202 may change the factors or behaviors that are monitored and/or adjust the granularity of its observations (i.e., the level of detail and/or the frequency at which real-time data is observed) based on a notification sent from the analyzer module 206 (e.g., a notification based on results of the analysis of the real-time data features).

The real-time data observer module may also generate or collect new or additional real-time data, and send the new/additional real-time data to the feature extractor module 204 and the analyzer module 206 for further analysis/classification. Such feedback communications between the real-time data observer module 202 and the analyzer module 206 may enable the computing device 220 to recursively increase the granularity of the observations (i.e., make more detailed and/or more frequent observations) or change the real-time data that are observed until the analyzer module can identify a location and/or characterize an RF environment to within a range of reliability or up to a threshold level of reliability. Such feedback communications may also enable the mobile computing device 220 to adjust or modify the behavior vectors and classifier models without consuming an excessive amount of the computing device's processing, memory, or energy resources.

In the various aspects, the mobile device 220 may be configured to work in conjunction with a network server to intelligently and efficiently identify the features, factors, and data points that are most relevant to determining the location of the computing device and/or characterizing the RF environment. For example, the device processor may be configured to receive a full classifier model from the network server, and use the received full classifier model to generate lean classifier models (i.e., data/behavior models) that are specific for the features and functionalities of the device or its software applications. The device processor may use the full classifier model to generate a family of lean classifier models of varying levels of complexity (or "leanness"). The leanest family of lean classifier models (i.e., the lean classifier model based on the fewest number of test conditions) may be applied routinely until the analyzer module determines that it cannot reliably determine the location of the computing device and characterizing the RF environment. In response to such determination, the analyzer module may provide feedback (e.g., a notification or instruction) to the real-time data observer module and/or the feature extractor module to use ever more robust classifier models within the family of generated lean classifier models, until a definitive determination of the location of the computing device and/or characterization of the RF environment classification of the behavior can be made by the analyzer module. In this manner, the computing device processor may strike a balance between efficiency and accuracy by limiting the use of the most complete, but resource-intensive classifier models to those situations where a robust classifier model is needed to definitively determining the location of the computing device and/or characterize its RF environment.

In various aspects, the device processor may be configured to generate lean classifier models by converting a representation or expression of real-time sensor data included in a full classifier model into boosted decision stumps. The device processor may prune or cull the full set of boosted decision stumps based on application, device, or sensor-specific features to generate a lean classifier model that includes a subset of boosted decision stumps included in the full classifier model. The device processor may then use the lean classifier model to intelligently monitor real-time sensor data, determine the location of the computing device, and characterize the RF environment of the location.

Boosted decision stumps are one-level decision trees that may have exactly one node (i.e., one test question or test condition) and a weight value, and may be well suited for use in a light, non-processor intensive binary classification of data/behaviors. Applying a behavior vector to boosted decision stump may result in a binary answer (e.g., 1 or 0, yes or no, etc.). For example, a question/condition tested by a boosted decision stump may include whether a word or sound detected by a device microphone is characteristic of an RF-sensitive environment, or whether an image of another device captured by a device camera is recognizable as an RF emissions generating hazard, the answers to which may be binary. Boosted decision stumps are efficient because they do not require significant processing resources to generate the binary answer. Boosted decision stumps may also be highly parallelizable, and thus many stumps may be applied or tested in parallel/at the same time (e.g., by multiple cores or processors in the computing device).

Figure 3:
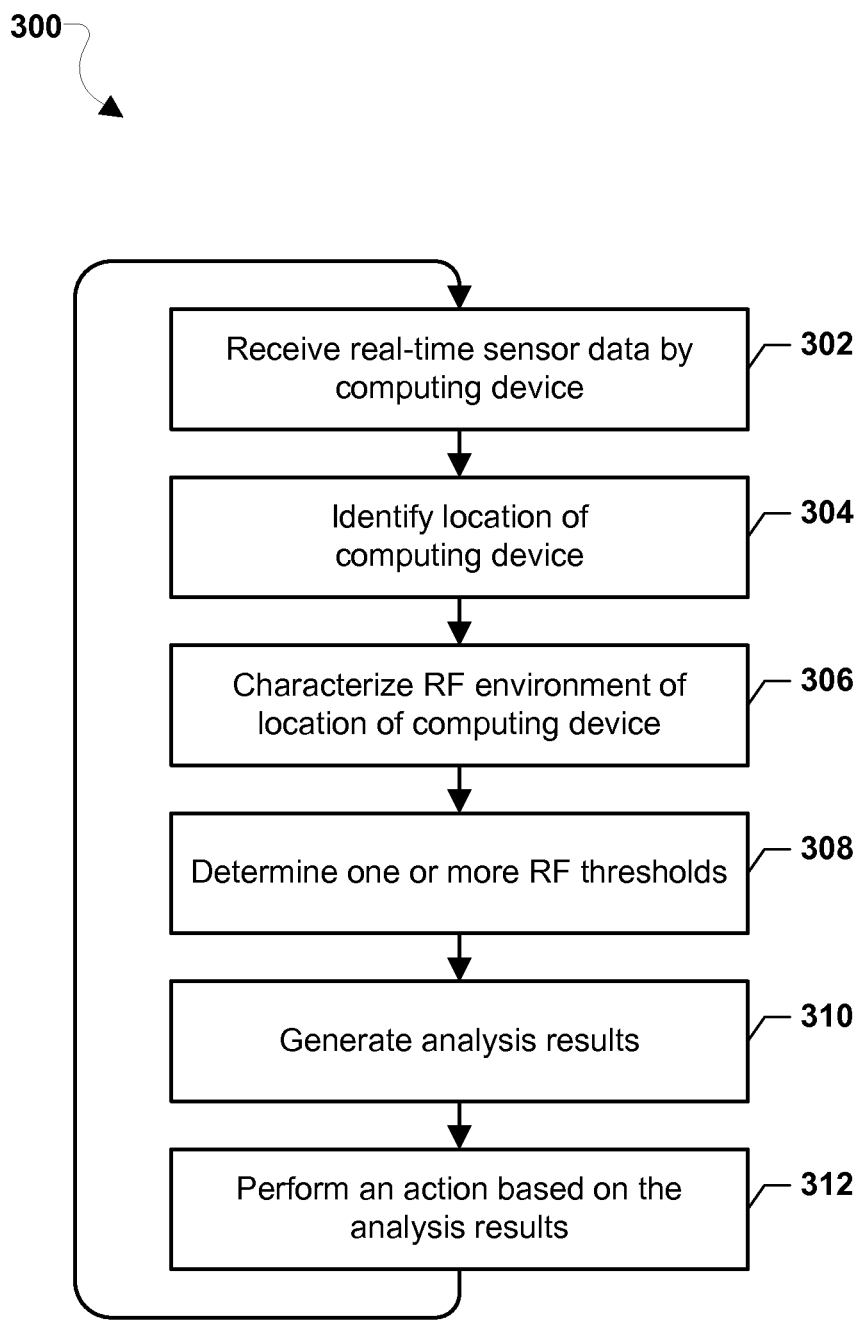
FIG. 3 is a process flow diagram illustrating a method for detecting a malfunction caused by RF interference in accordance with the various aspects.

FIG. 3 illustrates a method 300 of detecting a malfunction caused by RF interference in accordance with an aspect. The method 300 may be performed by a processing core or device processor of a mobile or resource constrained computing device, such as a processor on a system-on-chip (e.g., processors 101, 104, 106, and 108 on the SOC 100 illustrated in FIG. 1A) or any similar processor, and may employ a behavioral analysis system to characterize an RF environment (e.g., the RF environment characterization system 200 in FIG. 2).

In block 302, a device processor may receive real-time sensor data using one or more sensors of the computing device. Sensors of the computing device may include audio (e.g., a microphone), video (e.g., a camera), ambient light, vibration, acceleration, global positioning information (e.g., GPS), RFID information (e.g., from an interrogated RFID tag or an active RFID tag), radio access technology signal level (e.g., cellular or Wi-Fi signal strength), ambient FM or AM radio signal levels or other such signals, and other sensors of the computing device. The real-time data may thus include, for example, words, machine noises, and other sounds, images of locations, architectural features, machinery and other devices, bar codes, labels and signs that include icons or other symbolic information, labels and signs using any writing system (including Braille), GPS signals, compass information, gyroscope information, pressure sensor data, and magnetic field or flux readings, and other real-time data that may be received at a computing device sensor.

In block 304, the device processor may identify a location of the computing device by using the real-time data inputs as context clues to identify the location, relative location, and/or type of location of the computing device. For example, a received sound may have an acoustic fingerprint that matches a particular type of machinery that tends to be found at a particular type of location (e.g., an elevator tends to be located toward the center of a multi-story building) or in a particular specific location (e.g., an MRI machine is typically located in a hospital or in a medical testing facility). A received sound may also include recognizable words that may be identified (e.g., by voice recognition, audio fingerprint recognition, or another method of sound identification) and that the device processor may use as one or more context clues to the computing device location. An ambient sound level (e.g., an ambient noise sound pressure level) or a type of ambient sound (e.g., repetitive machine noises, irregular natural/biological sounds, etc.) may also provide context clues about the computing device location.

As another example, the device processor may identify an image received by a camera and analyze the image for location and context clues. For example, an image may include a building, sign, label, symbol, printed word, electronic device, barcode, label or other visible clue that can be analyzed to provide a context clue about the computing device location.

As another example, GPS information may provide detailed information about the geographic location of the computing device. As another example, accelerometer data may indicate relative motion in an elevator, up or down stairs, or other data that may provide a context clue about the computing device location. Similarly, compass and gyroscope data may provide relative location information. Other examples are also possible, based on the available sensors of the computing device.

In some aspects, the identified location may be specific (e.g., a hospital, a computer server farm, a high-security environment, etc.). In some aspects, the location may be identified relative to an identified aspect or device (e.g., proximate to a wireless baby monitor, near wireless security cameras, near an emergency radio beacon, etc.).

In block 306, the device processor may characterize an RF environment of the location of the computing device. The device processor may use the identified location and the real-time data inputs to characterize an RF environment, which may include characterizing including the criticality of RF interference in the environment. The device processor may also identify specific electronic devices in the environment, and may characterize their actual and/or potential RF emissions. The device processor may also characterize its own actual and/or potential RF emissions by performing a self-analysis to make sure that the current frequencies and strength of radiation being emitted by the computing device is within limits of other devices in the environment.

The computing device may also determine a severity level of actual or potential RF emissions or interference. For example, a location identified as a hospital may include many electronic devices that are sensitive to RF interference, and so it may be characterized as an RF-sensitive environment. As another example, a location identified as proximate to an MRI machine may be characterized as RF-sensitive because of the risk of interference with computing device functions. Similarly, a location identified as near a wireless baby monitor may be characterized as RF-sensitive because of possible interference with the baby monitor by RF emissions of the computing device.

In block 308, the device processor may determine one or more RF emissions thresholds that are suitable for the identified environment. In some aspects, an RF emissions threshold may relate to a level of RF emissions by the computing device that may pose a risk of interference for an electronic device that has been recognized to be present in the environment. In some aspects, an RF emissions threshold may relate to a level of RF emissions by an electronic device that has been recognized to be present in the environment that may pose a risk of interference for the computing device. The RF emissions threshold(s) may also be based on a determined severity level of actual or potential RF emissions or interference measured in the environment.

In block 310, the device processor may generate analysis results of a potential for RF interference with an electronic device in the environment. The analysis results may include comparing the one or more RF emissions thresholds and one or more aspects of the real-time sensor data, the identified location of the computing device, and the characterization of the RF environment of the computing device.

In block 312, the device processor may perform an action based on the analysis results. For example, the device processor may initiate or recommend an action to protect the computing device from an actual or potential RF interference risk in the environment, such as by securing a memory of the computing device, or by displaying an alert recommending that the device be removed from the environment. As another example, the action may also protect the environment (or an electronic device in the environment) from actual or potential RF emissions from the computing device, such as by shutting down an antenna of the computing device that is radiating RF emissions, or by putting the computing device into a sleep mode to reduce or stop its RF emissions, or by shutting the device down.

Figure 4:
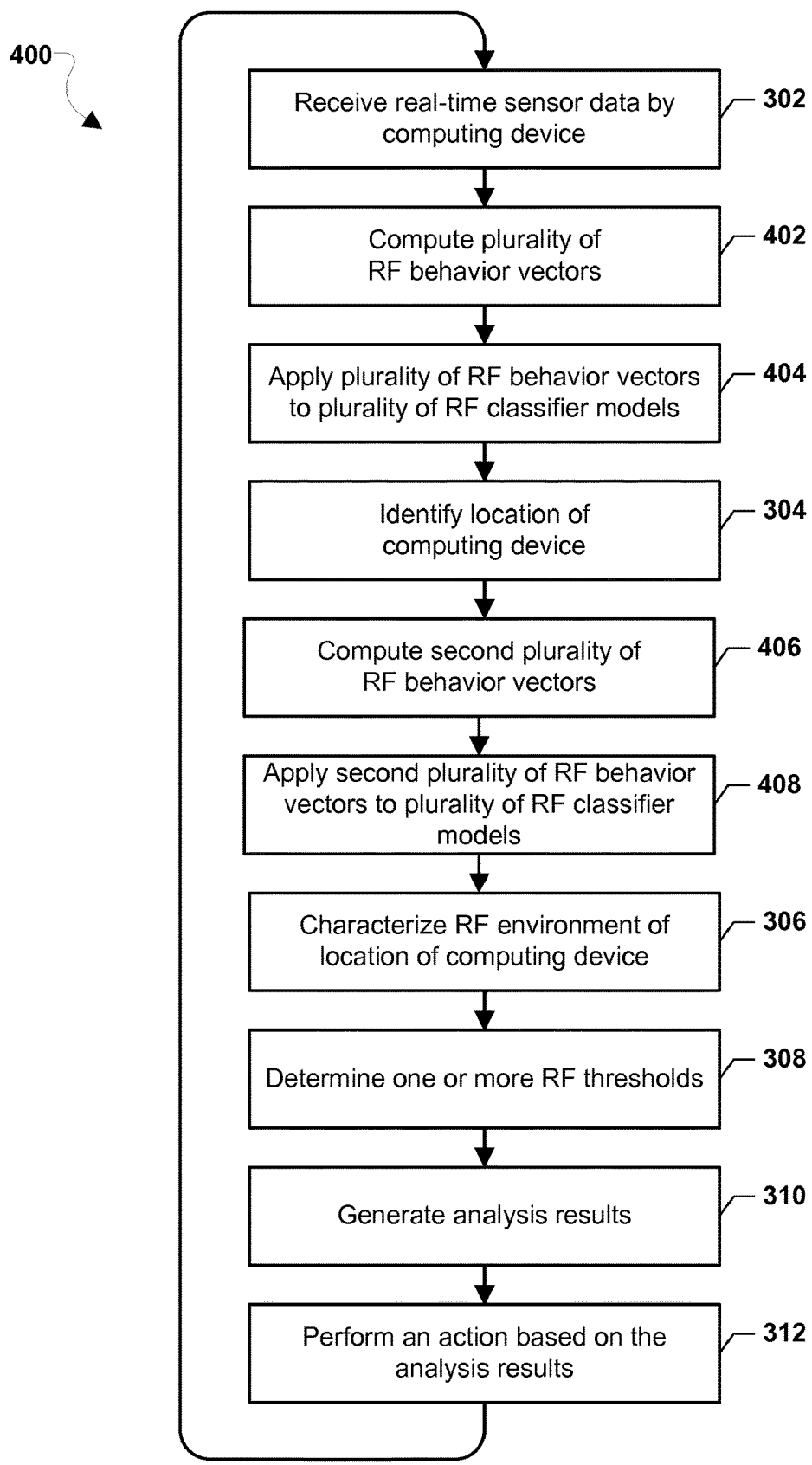
FIG. 4 is a process flow diagram illustrating a method for detecting a malfunction caused by RF interference in accordance with the various aspects.

FIG. 4 illustrates a method 400 of detecting a malfunction caused by RF interference in accordance with an aspect. The method 400 may be performed by a processing core or device processor of a mobile or resource constrained computing device, such as a processor on a system-on-chip (e.g., processors 101, 104, 106, and 108 on the SOC 100 illustrated in FIG. 1A) or any similar processor, and may employ a behavioral analysis system to characterize an RF environment (e.g., the RF environment characterization system 200 in FIG. 2). In some aspects of the operations performed in blocks 302-312, the device processor may perform operations similar to those described with reference to blocks 302-312 of the method 300 (see FIG. 3).

In block 302, a device processor may receive real-time sensor data using one or more sensors of the computing device as described with reference to FIG. 3. In block 402, the device processor may compute a plurality of RF behavior vectors. For example, a behavioral analysis system may generate one or more RF behavior vectors using the sensed real-time data. In block 404, the device processor may apply the computed RF behavior vectors to a plurality of RF classifier models. In block 304, based on the application of the generated RF behavior vectors to the plurality of RF classifier models, the device processor may identify a location of the computing device as described with reference to FIG. 3.

In optional block 406, the device processor may compute a second plurality of RF behavior vectors using the identified location of the computing device and/or the sensed real-time data. In optional block 408, the device processor may apply the generated second RF behavior vectors to a second plurality of RF classifier models. In block 306, based on the application of the generated second RF behavior vectors to the second plurality of RF classifier models, the device processor may characterize the RF environment of the location of the computing device as described with reference to FIG. 3.

Figure 5:
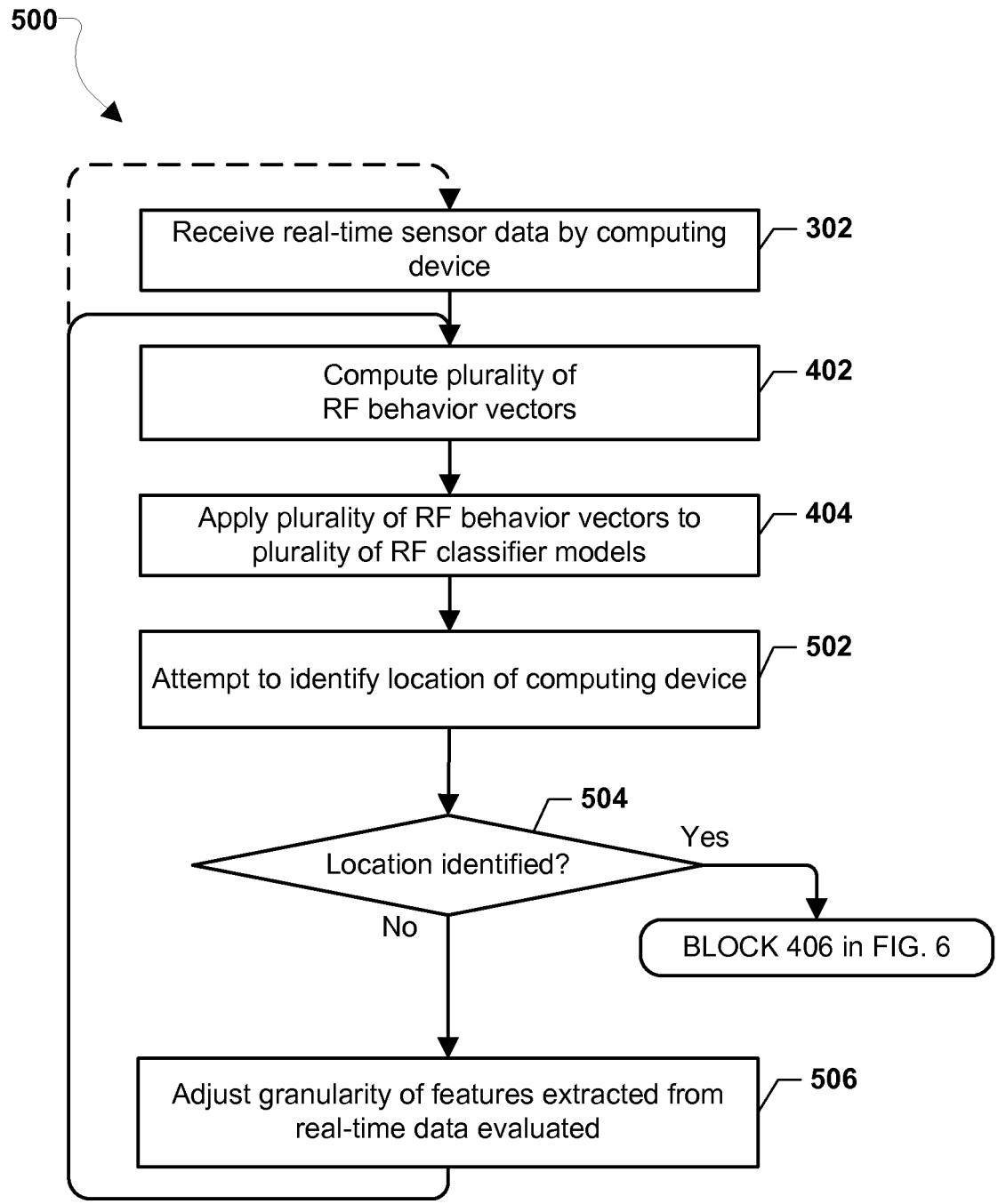
FIG. 5 is a process flow diagram illustrating a method for performing dynamic and adaptive observations and analysis of real-time sensor data in accordance with an aspect.

FIG. 5 illustrates an example method 500 for performing dynamic and adaptive observations of real-time sensor data in accordance with various aspects. The method 500 may be performed by a processing core or device processor of a mobile or resource constrained computing device, such as a processor on a system-on-chip (e.g., processors 101, 104, 106, and 108 on the SOC 100 illustrated in FIG. 1A) or any similar processor, and may employ a behavioral analysis system to characterize an RF environment (e.g., the RF environment characterization system 200 in FIG. 2). In some aspects of the operations performed in blocks 302, 402 and 404, the device processor may perform operations similar to those described with reference to block 302 of the method 300 and blocks 402 and 404 of the method 400 (see FIGS. 3 and 4).

In block 302, a device processor may receive real-time sensor data using one or more sensors of the computing device as described with reference to FIG. 3. The real-time sensor data may be monitored by a real-time data observer module (e.g., the real-time data observer module 202 in FIG. 2). In block 402, the device processor may compute a plurality of RF behavior vectors, and in block 404 the device processor may apply the computed RF behavior vectors to a plurality of RF classifier models as described with reference to FIG. 4.

In block 502, based on the application of the generated RF behavior vectors to the plurality of RF classifier models, the device processor may attempt to identify a location of the computing device. In determination block 504, the device processor may determine whether the location of the computing device is identified. For example, the sensed real-time data may provide insufficient context clues to enable to device processor to determine the location of the computing device to a threshold level of reliability. In response to determining that the location of the computing device is identified (e.g., determination block 504="Yes"), the device processor may compute a plurality of behavior vectors in block 406 and proceed with the operations in the method 600 described below with reference to FIG. 6.

In response to determining that the location of the computing device is not identified (i.e., determination block 504="No"), the device processor may adjust a granularity of its evaluation of the real-time data in block 506 and repeat the operations of the method 500 by recomputing the plurality of behavior vectors in block 402. For example, an analyzer module (i.e., the analyzer module 206 of FIG. 2) may be configured to adjust the number of features of the real-time data, or the level of detail of the features of the real-time data, that the analyzer module evaluates in response to determining that the location is not identified. In some aspects, the analyzer module may be configured to notify a real-time data observer module (e.g., the real-time data observer module 202 of FIG. 2) to add to the factors or behaviors that are monitored and/or increase the detail of the real-time data observations.

In some aspects, the real-time data observer module may adjust the granularity of its observations. A feature extractor module (e.g., the feature extractor module 202 of FIG. 2) may also extract a greater number of features from the real-time sensor data and compute a plurality of RF behavior vectors in block 402 using the greater number of extracted features. In some aspects, the real-time data observer module may also collect new or additional real-time data in block 302. The feedback communications among the real-time data observer module, the feature extractor module, and the analyzer module may enable the computing device to recursively increase the granularity of the observations (i.e., make more detailed and/or more frequent observations), change the real-time data that are observed, and/or extract different and/or more detailed features from the real-time sensor data until the analyzer module can identify the location of the computing device to a threshold level of reliability. Such feedback communications may also enable the mobile computing device to adjust or modify the behavior vectors and classifier models without consuming an excessive amount of the computing device's processing, memory, or energy resources.

Figure 6:
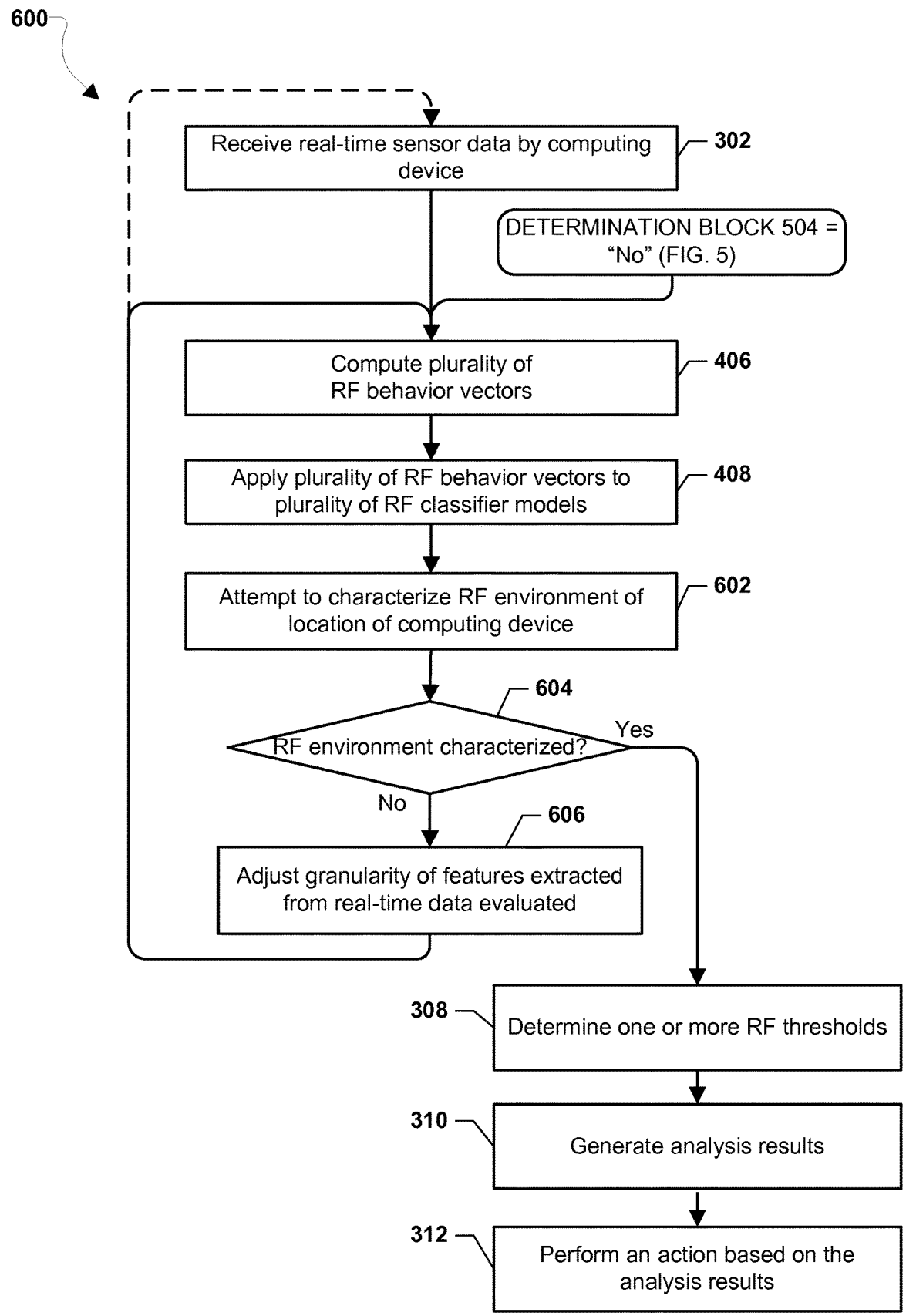
FIG. 6 is a process flow diagram illustrating a method for performing dynamic and adaptive observations and analysis of real-time sensor data in accordance with an aspect.

FIG. 6 illustrates an example method 600 for performing dynamic and adaptive observations of real-time sensor data in accordance with various aspects. The method 600 may be performed by a processing core or device processor of a mobile or resource constrained computing device, such as a processor on a system-on-chip (e.g., processors 101, 104, 106, and 108 on the SOC 100 illustrated in FIG. 1A) or any similar processor, and may employ a behavioral analysis system to characterize an RF environment (e.g., the RF environment characterization system 200 in FIG. 2). In some aspects of the operations performed in blocks 302, 308, 310, 406, and 408, the device processor may perform operations similar to those described with reference to blocks 302, 308 and 310 of the method 300 and blocks 402 and 404 of the method 400 (see FIGS. 3 and 4).

In response to determining that the location of the computing device is identified (e.g., determination block 504 in FIG. 5="Yes") the device processor may compute a second plurality of RF behavior vectors using the identified location of the computing device and/or the sensed real-time data in block 406. In block 408, the device processor may apply the generated second RF behavior vectors to a second plurality of RF classifier models. In some aspects, the operations performed in blocks 406 and 408 may be optional, and the operations of block 602 may be performed without performing the operations of blocks 406 and 408.

In block 602, based on the application of the generated second RF behavior vectors to the second plurality of RF classifier models, the device processor may attempt to characterize the RF environment of the location of the computing device. In response to determining that the RF environment is characterized (i.e., determination block 604="Yes") the device processor may determine one or more RF emissions thresholds for the environment in block 308. In block 310, the device processor may generate analysis results of a potential for RF interference with an electronic device in the environment, and in block 312, the device processor may perform an action based on the analysis results.

In response to determining that the RF environment is not characterized (i.e., determination block 604="No"), the device processor may adjust a granularity of its evaluation of the real-time data in block 606 and recomputed the plurality of RF behavior vectors in block 406. For example, an analyzer module (e.g., the analyzer module 206 of FIG. 2) may be configured to adjust the number of features of the real-time data, or the level of detail of the features of the real-time data, that the analyzer module evaluates in response to determining that the location is not identified. In some aspects, the analyzer module may be configured to notify a real-time data observer module (e.g., the real-time data observer module 202 of FIG. 2) to add to the factors or behaviors that are monitored and/or increase the detail of the real-time data observations.

In some aspects, the real-time data observer module may adjust the granularity of its observations. A feature extractor module (e.g., the feature extractor module 202 of FIG. 2) module may then extract a greater number of features from the real-time sensor data and compute a plurality of RF behavior vectors in block 406 using the greater number of extracted features. In some aspects, the real-time data observer module may also collect new or additional real-time data in block 302. The feedback communications among the real-time data observer module, the feature extractor module, and the analyzer module may enable the computing device to recursively increase the granularity of the observations (i.e., make more detailed and/or more frequent observations), change the real-time data that are observed, and/or extract different and/or more detailed features from the real-time sensor data, until the analyzer module can characterize the RF environment of the location of the computing device to a threshold level of reliability. Such feedback communications may also enable the mobile computing device to adjust or modify the behavior vectors and classifier models without consuming an excessive amount of the computing device's processing, memory, or energy resources.

The various aspects improve upon existing solutions by using behavior analysis and/or machine learning techniques to monitor and analyze real-time data to determine an actual or potential RF interference risk to an electronic device in an environment. The use of behavior analysis or machine learning techniques is important because modern computing devices are highly configurable and complex systems, and the relevant and/or available data or extractable features may be different in each computing device. Further, different combinations of device features/factors may require an analysis in each device in order for that device to determine an actual or potential RF interference risk to an electronic device in an environment. The precise combination of data and/or features that a computing device may monitor may in some cases be determined using information obtained from the specific computing device in which the data is monitored in real-time. For these and other reasons, existing solutions are not adequate for monitoring real-time sensor data received by a computing device and determining an actual or potential RF interference risk to an electronic device (either the computing device or another electronic device) in an environment, and without consuming a significant amount of the computing device's processing, memory, or power resources.

Figure 7:
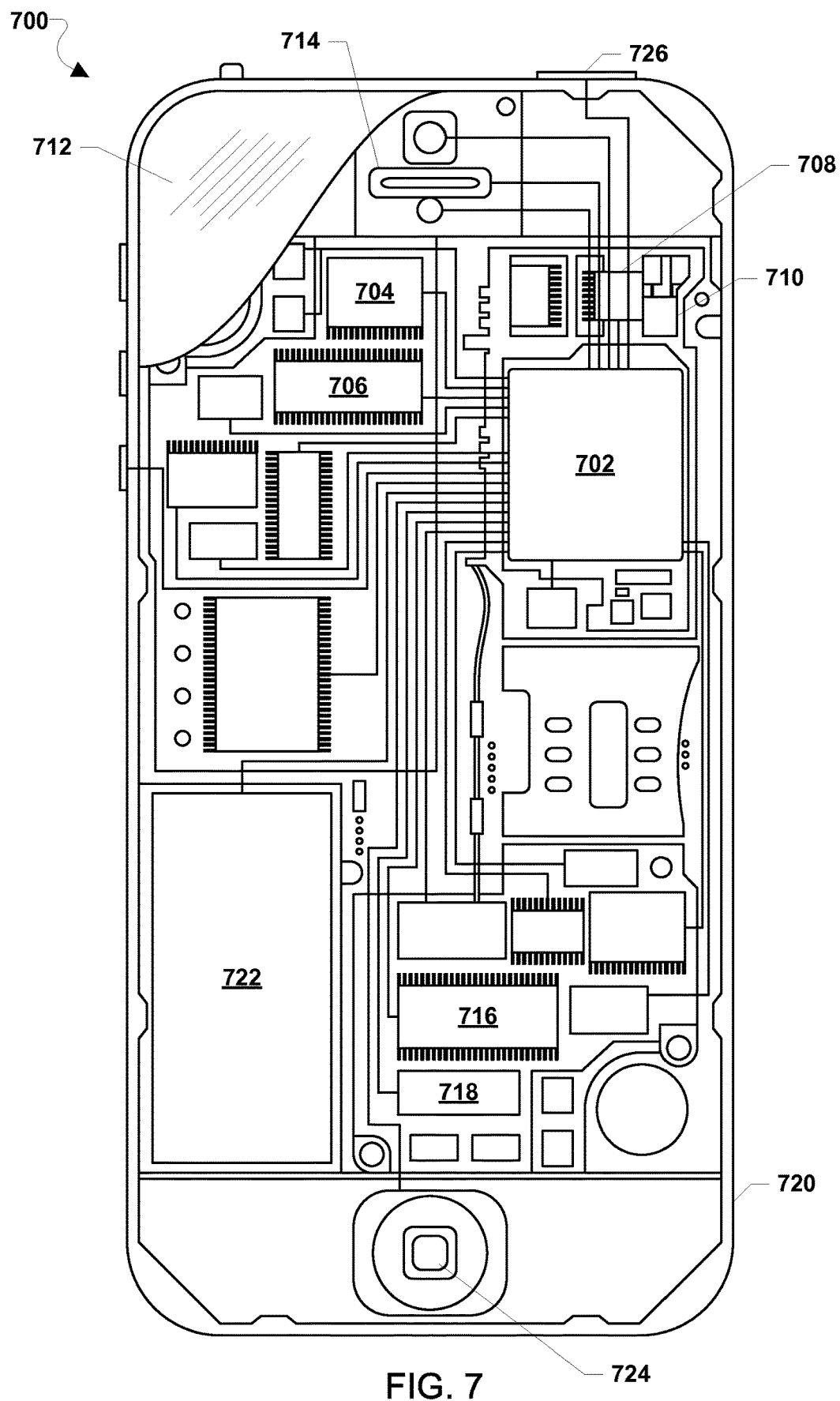
FIG. 7 is a component block diagram of a mobile device suitable for use with various aspects.

The various aspects, including the aspects discussed above with reference to FIGS. 1-6, may be implemented on a variety of computing devices, an example of which is the mobile communication device 700 illustrated in FIG. 7. The mobile computing device 700 may include a processor 702 coupled to internal memory 704, a display 712, and to a speaker 714. The processor 702 may be one or more multi-core integrated circuits designated for general or specific processing tasks. The internal memory 704 may be volatile or non-volatile memory, and may also be secure and/or encrypted memory, or unsecure and/or unencrypted memory, or any combination thereof. The mobile communication device 700 may have two or more radio signal transceivers 708 (e.g., Peanut, Bluetooth, Zigbee, Wi-Fi, RF radio, etc.) and antennae 710 for sending and receiving communications, coupled to each other and to the processor 702. Additionally, the mobile communication device 700 may include an antenna 710 for sending and receiving electromagnetic radiation that may be connected to a wireless data link and/or transceiver 708 coupled to the processor 702. The mobile communication device 700 may include one or more cellular network wireless modem chip(s) 716 coupled to the processor 702 and antennae 710 that enables communications via two or more cellular networks via two or more radio access technologies.

The mobile communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown). The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The processor 702 may be any programmable microprocessor, microcomputer or multiple processor chip or chips that can be configured by software instructions (applications) to perform a variety of functions, including the functions of various aspects described below. In some mobile communication devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions. In various aspects, the processor 712 may be a device processor, processing core, or an SOC (such as the example SOC 100 illustrated in FIG. 1A). In an aspect, the mobile communication device 700 may include an SOC, and the processor 702 may be one of the processors included in the SOC (such as one of the processors 101, 104, 106, 108, and 110 illustrated in FIG. 1A).

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer code or program code for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the various aspects. Various modifications to these aspects will be readily apparent to those skilled in the art, and the generic principles defined herein may be applied to other aspects without departing from the spirit or scope of the various aspects. Thus, the various aspects are not intended to be limited to the aspects shown herein but is to be accorded the widest scope consistent with the following claims and the principles and novel features disclosed herein.

What is claimed is:

1. A method of detecting, by a computing device, a malfunction caused by radio frequency (RF) interference, comprising:
    identifying, on the computing device, a location of the computing device based on a plurality of real-time data inputs received by the computing device;
    characterizing, on the computing device, an RF environment of the computing device based on the identified location and the plurality of real-time data inputs, wherein characterizing the RF environment comprises:
        identifying, on the computing device, specific non-cellular network devices at the identified location that are sources of RF emissions; and
        determining a severity of actual or potential interference to any identified specific non-cellular network device caused by RF emissions from the computing device;
    determining, on the computing device, at least one RF emissions threshold for the RF emissions of the computing device based on the characterization of the RF environment;
    comparing, on the computing device, the RF emissions of the computing device to the at least one RF emissions threshold; and
    performing, on the computing device, an action in response to determining that the RF emissions of the computing device exceed the at least one RF emissions threshold, wherein the action is chosen from displaying an alert recommending that the computing device be removed from the environment, shutting down an antenna of the computing device, putting the computing device into a sleep mode, or shutting down the computing device.

2. The method of claim 1, wherein identifying, on the computing device, a location of the computing device based on a plurality of real-time data inputs received by the computing device comprises:
    computing a plurality of RF behavior vectors based on the plurality of real-time data inputs; and
    identifying the location of the computing device using the plurality of RF behavior vectors.

3. The method of claim 2, wherein identifying the location of the computing device using the plurality of RF behavior vectors further comprises:
    applying the plurality of RF behavior vectors to a plurality of RF classifier models to generate analysis results; and
    identifying the location of the computing device based on the analysis results.

4. The method of claim 1, wherein characterizing, on the computing device, an RF environment of the computing device based on the identified location and the plurality of real-time data inputs further comprises:
    computing a plurality of RF behavior vectors based on the plurality of real-time data inputs; and
    characterizing the RF environment of the computing device using the plurality of RF behavior vectors.

5. The method of claim 4, wherein characterizing the RF environment of the computing device using the plurality of RF behavior vectors comprises:
    applying plurality of RF behavior vectors to a plurality of RF classifier models to generate analysis results; and
    characterizing the RF environment of the computing device based on the analysis results.

6. The method of claim 5, wherein determining, on the computing device, at least one RF emissions threshold for the RF emissions of the computing device based on the RF characterization of the environment further comprises determining at least one RF emissions threshold based on the analysis results.

7. The method of claim 1, further comprising comparing, on the computing device, the RF emissions of any identified specific non-cellular network device to an RF emissions threshold for RF emissions of the identified non-cellular network device.

8. The method of claim 7, further comprising performing an action in response to determining that the RF emissions of any identified specific non-cellular network device exceed the RF emissions threshold for RF emissions by the identified non-cellular network device.

9. The method of claim 1, wherein performing, on the computing device, an action in response to determining that the RF emissions of the computing device exceed the at least one RF emissions threshold comprises performing an action to protect at least one identified specific non-cellular network device.

10. The method of claim 1, wherein the plurality of real-time data inputs include at least one of a video input, an audio input, an ambient light level, a vibration, an acceleration, compass information, global positioning information, RFID tag information, a radio access technology signal level, an ambient FM signal level, and an ambient AM signal level.

11. A mobile computing device, comprising:
a processor configured with processor-executable instructions to:
identify a location of the computing device based on a plurality of real-time data inputs received by the computing device;
characterize an RF environment of the computing device based on the identified location and the plurality of real-time data inputs, wherein characterizing the RF environment comprises:
identifying any specific non-cellular network devices at the identified location that are sources of RF emissions; and
determining a severity of actual or potential interference to any identified specific non-cellular network device caused by RF emissions from the computing device;
determine at least one RF emissions threshold for the RF emissions of the computing device based on the characterization of the RF environment;
compare the RF emissions of the computing device to the at least one RF emissions threshold; and
perform an action in response to determining that the RF emissions of the computing device exceed the at least one RF emissions threshold, wherein the action is chosen from displaying an alert recommending that the computing device be removed from the environment, shutting down an antenna of the computing device, putting the computing device into a sleep mode, or shutting down the computing device.

12. The mobile computing device of claim 11, wherein the processor is further configured with processor-executable instructions to:
compute a plurality of RF behavior vectors based on the plurality of real-time data inputs; and
identify the location of the computing device using the plurality of RF behavior vectors.

13. The mobile computing device of claim 12, wherein the processor is further configured with processor-executable instructions to:
apply the plurality of RF behavior vectors to a plurality of RF classifier models to generate analysis results; and
identify the location of the computing device based on the analysis results.

14. The mobile computing device of claim 11, wherein the processor is further configured with processor-executable instructions to:
compute a plurality of RF behavior vectors based on the plurality of real-time data inputs; and
characterize the RF environment of the computing device using the plurality of RF behavior vectors.

15. The mobile computing device of claim 14, wherein the processor is further configured with processor-executable instructions to:
apply plurality of RF behavior vectors to a plurality of RF classifier models to generate analysis results; and
characterize the RF environment of the computing device based on the analysis results.

16. The mobile computing device of claim 15, wherein the processor is further configured with processor-executable instructions to determine at least one RF emissions threshold for RF emissions of the computing device based on the analysis results.

17. The mobile computing device of claim 11, wherein the processor is further configured with processor-executable instructions to compare the RF emissions of any specific identified non-cellular network device to an RF emissions threshold for RF emissions of the identified non-cellular network device.

18. The mobile computing device of claim 17, wherein the processor is further configured with processor-executable instructions to perform an action to protect the computing device in response to determining that RF emissions of any identified specific non-cellular network device exceed the RF emissions threshold for RF emissions by the identified non-cellular network device.

19. The mobile computing device of claim 11, wherein the processor is further configured with processor-executable instructions to perform an action in response to determining that the characterization of the RF environment exceeds the at least one RF emissions threshold by performing an action to protect at least one identified specific non-cellular network device.

20. The mobile computing device of claim 11, wherein the processor is configured with processor-executable instructions such that the plurality of real-time data inputs include at least one of a video input, an audio input, an ambient light level, a vibration, an acceleration, compass information, global positioning information, RFID tag information, a radio access technology signal level, an ambient FM signal level, and an ambient AM signal level.

21. A non-transitory processor-readable storage medium having stored thereon processor-executable software instructions configured to cause a processor of a computing device to perform operations for detecting a malfunction caused by radio frequency (RF) interference comprising:
identifying a location of the computing device based on a plurality of real-time data inputs received by the computing device;
characterizing an RF environment of the computing device based on the identified location and the plurality of real-time data inputs, wherein characterizing the RF environment comprises:
identifying any specific non-cellular network devices at the identified location that are sources of RF emissions; and
determining a severity of actual or potential interference to any identified specific non-cellular network device caused by RF emissions from the computing device;
determining at least one RF emissions threshold for the RF emissions of the computing device based on the characterization of the RF environment;
comparing the RF emissions of the computing device to the at least one RF emissions threshold; and
performing an action in response to determining that the RF emissions of the computing device exceed the at least one RF emissions threshold, wherein the action is chosen from displaying an alert recommending that the computing device be removed from the environment, shutting down an antenna of the computing device, putting the computing device into a sleep mode, or shutting down the computing device.

22. The non-transitory processor-readable storage medium of claim 21, wherein the stored processor-executable software instructions are configured to cause the processor of the computing device to perform operations such that identifying a location of the computing device based on a plurality of real-time data inputs received by the computing device comprises:

computing a plurality of RF behavior vectors based on the plurality of real-time data inputs; and identifying the location of the computing device using the plurality of RF behavior vectors.

23. The non-transitory processor-readable storage medium of claim 22, wherein the stored processor-executable software instructions are configured to cause the processor of the computing device to perform operations such that identifying the location of the computing device using the plurality of RF behavior vectors comprises:

applying the plurality of RF behavior vectors to a plurality of RF classifier models to generate analysis results; and identifying the location of the computing device based on the analysis results.

24. The non-transitory processor-readable storage medium of claim 21, wherein the stored processor-executable software instructions are configured to cause the processor of the computing device to perform operations such that characterizing an RF environment of the computing device based on the identified location and the plurality of real-time data inputs further comprises:

computing a plurality of RF behavior vectors based on the plurality of real-time data inputs; and characterizing the RF environment of the computing device using the plurality of RF behavior vectors.

25. A mobile computing device, comprising:

means for identifying a location of the computing device based on a plurality of real-time data inputs received by the computing device;

means for characterizing an RF environment of the computing device based on the identified location and the plurality of real-time data inputs, wherein the means for characterizing the RF environment comprises:

means for identifying any specific non-cellular network devices at the identified location that are sources of RF emissions; and means for determining a severity of actual or potential interference to any identified specific non-cellular network device caused by RF emissions from the computing device;

means for determining at least one RF emissions threshold for the RF emissions of the computing device based on the characterization of the RF environment;

means for comparing the RF emissions of the computing device to the at least one RF emissions threshold; and means for performing an action in response to determining that the RF emissions of the computing device exceed the at least one RF emissions threshold, wherein the action is chosen from displaying an alert recommending that the computing device be removed from the environment, shutting down an antenna of the computing device, putting the computing device into a sleep mode, or shutting down the computing device.

26. The computing device of claim 25, wherein means for identifying a location of a computing device based on a plurality of real-time data inputs received by the computing device comprises:

means for computing a plurality of RF behavior vectors based on the plurality of real-time data inputs; and means for identifying the location of the computing device using the plurality of RF behavior vectors.

27. The computing device of claim 26, wherein means for identifying the location of the computing device using the plurality of RF behavior vectors comprises:

means for applying the plurality of RF behavior vectors to a plurality of RF classifier models to generate analysis results; and means for identifying the location of the computing device based on the analysis results.

28. The computing device of claim 25, wherein means for characterizing an RF environment of the computing device based on the identified location and the plurality of real-time data inputs comprises:

means for computing a plurality of RF behavior vectors based on the plurality of real-time data inputs; and means for characterizing the RF environment of the computing device using the plurality of RF behavior vectors.

* * * * *